United States Patent [19]

Hecksel et al.

[11] Patent Number: 6,151,707
[45] Date of Patent: *Nov. 21, 2000

[54] SYSTEM AND METHOD FOR PRODUCT REGISTRATION

[75] Inventors: David L. Hecksel; Russel A. Duderstadt, both of Dallas, Tex.

[73] Assignee: Remedy Corporation, Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/975,536

[22] Filed: Nov. 20, 1997

[51] Int. Cl.$^7$ .................................................. G06F 9/445
[52] U.S. Cl. ................................................................ 717/11
[58] Field of Search ............................. 395/712; 380/51; 705/27, 59; 713/200, 201; 717/11

[56] References Cited

U.S. PATENT DOCUMENTS

| | | | |
|---|---|---|---|
| 5,103,476 | 4/1992 | Waite et al. | 380/4 |
| 5,388,211 | 2/1995 | Hornbuckle | 395/712 |
| 5,390,297 | 2/1995 | Barber et al. | 713/201 |
| 5,490,216 | 2/1996 | Richardson, III | 380/4 |
| 5,528,490 | 6/1996 | Hill | 395/712 |
| 5,579,479 | 11/1996 | Plum | 380/4 |
| 5,687,372 | 11/1997 | Hotea et al. | 395/675 |
| 5,701,452 | 12/1997 | Siefert | 395/601 |
| 5,704,029 | 12/1997 | Wright, Jr. | 395/149 |
| 5,708,780 | 1/1998 | Levergood et al. | 395/200 |
| 5,710,887 | 1/1998 | Chelliah et al. | 395/226 |
| 5,715,314 | 2/1998 | Payne et al. | 380/24 |
| 5,724,424 | 3/1998 | Gifford | 380/24 |
| 5,745,682 | 4/1998 | Keenan | 395/200.5 |
| 5,761,649 | 6/1998 | Hill | 705/27 |
| 5,778,356 | 7/1998 | Heiny | 707/2 |
| 5,790,664 | 8/1998 | Coley et al. | 380/4 |
| 5,790,785 | 8/1998 | Klug et al. | 713/202 |
| 5,799,285 | 8/1998 | Klingman | 705/26 |
| 5,825,893 | 10/1998 | Kara | 380/51 |
| 5,925,127 | 7/1999 | Ahmad | 713/200 |
| 5,935,251 | 8/1999 | Moore | 713/202 |
| 5,944,821 | 8/1999 | Angelo | 713/200 |
| 6,023,698 | 2/2000 | Lavey, Jr. et al. | 707/10 |

OTHER PUBLICATIONS

Title: Legally Operating and Tracking Software in a LAN environment, IBM Technical Disclosure Bulletin, Mar. 1991.

Title: In a millisecond, Microsoft boots up marketing database Microsoft: Uses integrated marketing in building sales, source: Advertising Age, Nov. 8, 1993.

Title: Revolutionary online Software Registration product, CyberReg, Offers Higher Return Rates and Increased Revenues, source: PR Newswire, Jun. 4, 1997.

Title: WebEntree: A web service aggregator, author: Y Zhao, IBM Systems Journal, 1998.

Title: Amplitude Unveils Complete Event Registration Solution, Web–Based EventCenter Registration Module Provides Fully Integrated Event, Source: Business Wire, 1998.

(List continued on next page.)

*Primary Examiner*—Tariq R. Hafiz
*Assistant Examiner*—Chameli C. Das
*Attorney, Agent, or Firm*—Blakely, Sokoloff, Taylor & Zafman LLP

[57] ABSTRACT

A method for registering a software program and performing post-registration activities includes initiating a registration session for the software program; identifying a matching software program; selecting registration information stored in a memory, the selected registration information provided by a user during a previous registration session for the matching software program; and proceeding with the registration session based on the selected registration information.

In another embodiment, the method includes determining a current registration status of the software program based on a current date, a reference date, and a configurable post-registration activity period; and conducting the post-registration activity based on the status of the software program.

56 Claims, 9 Drawing Sheets

OTHER PUBLICATIONS

Title: Engaging User Profiles on Web Announce a suite of software & services for Web site advertiser, source: PC week, 1997.

Title: Revolutionary online software registration product, CyberReg, offers higher return rates and increased revenues, source PE Newswire, 1997.

Stan Dolberg, *The Forrester Report: Commerce Technology Strategies*, vol. One, No. One (May 1998) <wysiwyg://97/ http://www.forrester.com/cgi–bin/cgi.p1>.

Richard Dean, Builder.Com—Web Business, *Personalizing Your Web Site*, (Jun. 2, 1998), <http://www.builder.com/Business/Personal/?st.bl.bu.4.feat.1164>.

Suzanne Galante and Susan Countryman, CNET News.com, *Lycos pushes into portal niche*, (Apr. 30, 1998), <http://www.news.com/News/Item/0,4,21661,00.html>.

Courtney Macavinta, CNET News.com, *Excite, Lycos get more personal*, (Apr. 13, 1998), <http://www.news.com/News/Item/0,4,21027,pp.html>.

Tim Clark, CNET News.com, *Netscape in personalization*, (Apr. 14, 1998), <http://www/news.com/News/Item/0,4, 21100,00.html>.

JavaServer™, *JavaServer Pages Specification—Draft*, (1998), <File://N|/users/dave/JSP/jsp_spec.html>.

Michelle V. Rafter, The Industry Standard, *J. Crew Mounts big Web Push for Fall '98*, (Jul. 13, 1998), <www.thestandard.net>.

Engage Technologies| Accipiter—ProfileServer Product Overview, *ProfileServer 4.0 Maximize the interactive power of the Internet with personalized marketing strategies*, <http://www.engage.com/products/profileserver/default-.ntm>.

GIF image 467×112 pixels, (1998), <http://www.vignette.com/PressKit/launchbar.gif>.

GIF image 322×416 pixels, (1998), <http://www.vignette.com/PressKit/profilemgr.gif>.

GIF image 635×449 pixels, (1998), <http://www.vignette.com/PressKit/projectmgr.gif>.

GIF image 523×282 pixels, (1998), <http://www.vignette.com/PressKit/reportwizard.gif>.

GIF image 618×449 pixels, (1998), <http://www.vignette.com/PressKit/taskmgr.gif>.

GIF image 600×467 pixels, (1998), <http://www.vignette.com/PressKit/templateeditor.gif>.

Ulinski, J.; "Electronic Customer Feedback Interface"; Xerox Disclosure Journal; vol. 18, No. 2, p. 145; Mar./Apr. 1993.

Hawkins, J.; "Lessons from Electronic Surveys"; Conference Proceedings on User Services, SIGUCCS '92; pp. 105–110.

31

NUMBER OF TIMES PROGRAM ACCESSED
TOTAL USAGE TIME
NUMBER OF USES OF FUNCTION A
NUMBER OF USES OF FUNCTION B
NUMBER OF USES OF FUNCTION A WITH FUNCTION B
ERROR MESSAGES ENCOUNTERED
..

33

1. WHERE DID YOU PURCHASE THIS PRODUCT?
2. HOW DID YOU HERE ABOUT THIS PRODUCT?
3. WHAT ARE YOUR IMPRESSIONS OF THE PRODUCT?
4. WHAT ASPECTS OF THE PRODUCT COULD BE IMPROVED?
5. HAVE YOU CONSIDERED PURCHASING PRODUCT X?
6. HAVE YOU CONSIDERED UPGRADING THIS PRODUCT?
7. WHY HAVE YOU ONLY USED FEATURE A <u><VARIABLE Y></u> TIMES?

28

UNIQUE REGISTRATION NUMBER
USER NAME
ADDRESS
PHONE NUMBER
..
MEMORY AVAILABLE
PROCESSOR SPEED
..
RESPONSES TO PREVIOUS SURVEY QUESTIONS
NATIONAL LANGUAGE OF SOFTWARE PROGRAM
PUBLISHER OF SOFTWARE PROGRAM

30

| | |
|---|---|
| 0 MONTHS | 1-2 |
| 3 MONTHS | 3-4 |
| 6 MONTHS | 5-6 |
| 1 YEAR | RE-REGISTER, PRESENT MARKETING INFO |
| 3 MONTHS AFTER RE-REGISTRATION | 7 (INSERT VARIABLE Y) |
| .. | |

INSTALLATION DATE=
REGISTRATION DATE=
LAST ACCESSED DATE=
REMINDER INTERVAL=
REMINDER COUNT=
REMINDER LIMIT=

POST-REGISTRATION ACTIVITY PERIOD A=
..
POST-REGISTRATION ACTIVITY PERIOD N=
REGISTRATION STATUS A=
..
REGISTRATION STATUS N=

ACTIVITY DATE A = POST-REGISTRATION ACTIVITY PERIOD A+INSTALLATION DATE
..
ACTIVITY DATE N = POST-REGISTRATION ACTIVITY PERIOD N+INSTALLATION DATE 132, 134, 136, 138

SYSTEM AND METHOD FOR PRODUCT REGISTRATION

TECHNICAL FIELD OF THE INVENTION

The present invention relates to the field of data communication and processing, and more particularly to a system and method for product registration and post-registration activity.

BACKGROUND OF THE INVENTION

Software publishers often utilize business models that focus on customer relationship marketing approaches for sales, customer support, and managing their installed customer base. These models depend, at least in part, on post-sale activities such as software registration, cross product line selling, product upgrade selling service offerings, customer surveys, and technical support. Software registration forms the foundation for these customer relationship business activities.

Products utilizing software-driven customer relationship marketing functionality typically include methods enabling the customer to provide data to the publisher. One approach includes a post card with the software requesting various customer information and responses to survey questions. This approach has proven largely ineffective, since most customers refuse to spend the time and effort necessary to complete the forms. In addition, survey questions asked at the time of registration are of little value, because, not having previously used the software program, the user is without knowledge to answer questions related to specific aspects of the software program's capabilities.

Another approach to provide data to the publisher includes registration software with the purchased software, which is designed to be executed upon the installation of the purchased software. In this approach, the customer enters registration data and answers survey questions during installation, and then mails, faxes, e-mails or otherwise electronically communicates or transmits the data to the publisher. This approach suffers from the same deficiencies as the previously described approach. In addition, this approach requires the user to input the same registration data, time after time, for each software product registered, no matter how similar the information requested. This wastes the user's time and increases the chances of error in entering the data.

Another problem with this approach is that the requested information and survey questions are generally hard coded into the software at the time of purchase. Typical approaches, therefore, provide no method of configuring the timing or content of the data requests or information presented. This is a significant disadvantage where products have been modified or new products have become available, rendering the data requests inadequate or obsolete.

Still another problem with conventional approaches is that when updated registration data is transferred to a publisher's database, a duplicate data file is typically created. It is generally difficult to eliminate duplicate registration files for the same software program because each file may have only small differences. These duplicate files create problems associated with undesired multiple user contacts, one for each duplicate file.

SUMMARY OF THE INVENTION

In accordance with the present invention, a system and method for product registration and post-registration activity are provided that substantially eliminate or reduce disadvantages or problems associated with previously developed registration systems and methods. In particular, the present invention maintains a variety of information to enable multiple registrations, deferred registrations, configurable post-registration activities, and other functions.

In one embodiment of the present invention, a method for registering a software program includes initiating a registration session for the software program; identifying a matching software program; selecting registration information stored in a memory, the selected registration information associated with the matching software program and provided by a user during a previous registration session for the matching software program; and proceeding with the registration session based on the selected registration information.

In another embodiment of the present invention, a method for performing a post-registration activity associated with a software program includes determining a current registration status of the software program based on a current date, a reference date, and a configurable post-registration activity period; and conducting the post-registration activity based on the status of the software program.

Technical advantages of the present invention include a system and method for accessing previously stored registration information to assist a user in a current software program registration. The system may advantageously utilize existing registration information associated with a matching software program to populate data fields presented to the user. This saves the user from having to independently ascertain the information and alleviates the tedious and error prone task of data entry. In addition, the present invention provides a method of storing registration information in a common memory to further facilitate data sharing between matching software programs. By arranging data according to the user, national language, and publisher of the software program, the present invention facilitates data sharing between software programs likely to have the same or similar registration information. Additionally, arranging data by user in a multi-user system prevents one user from accessing or corrupting another user's registration information.

Still another advantage of the present invention is the provision of unique registration numbers identifying registration data associated with a re-registration of a software program. The unique identifier facilitates eliminating duplicate outdated records stored in a remote database without arduous searching for differences in duplicate files. The present invention further facilitates communication of data to a remote site upon completion of the registration or post-registration activity. In addition, the invention provides the option of deferring transmission of the data, and sending a batch file including registration information from more than one software program during a subsequent session.

Additional advantages of the present invention include a system and method of performing configurable post-registration activities. Using this technique, the publisher can advantageously control the timing of data presentation and collection based on configurable post-registration activity periods. In addition, the content of the data presented may be influenced by statistics relating to use of the software program. Post-registration activity periods may be stored in configuration files to promote modification of registration and marketing data as updates become necessary without requiring modification to the registration software program.

In addition, the invention facilitates convenient, reliable communication of completed registration information to the publisher. Rather than requiring the customer to determine how to transfer the registration data to the publisher, the software registration system automatically generates a list of available communication methods for presentation to the user. Once the user selects an available communication method, the registration system communicates the registration information to the publisher, or presents information to assist the user in communicating the registration information to the publisher. This saves the user from having to independently ascertain the information and alleviates the tedious task of data entry, which increases the probability that the completed registration information will reach the publisher. Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIGS. 2a–2b illustrate block diagrams of an exemplary memory constructed in accordance with the teachings of the present invention;

DETAILED DESCRIPTION OF THE INVENTION

Figure 1:
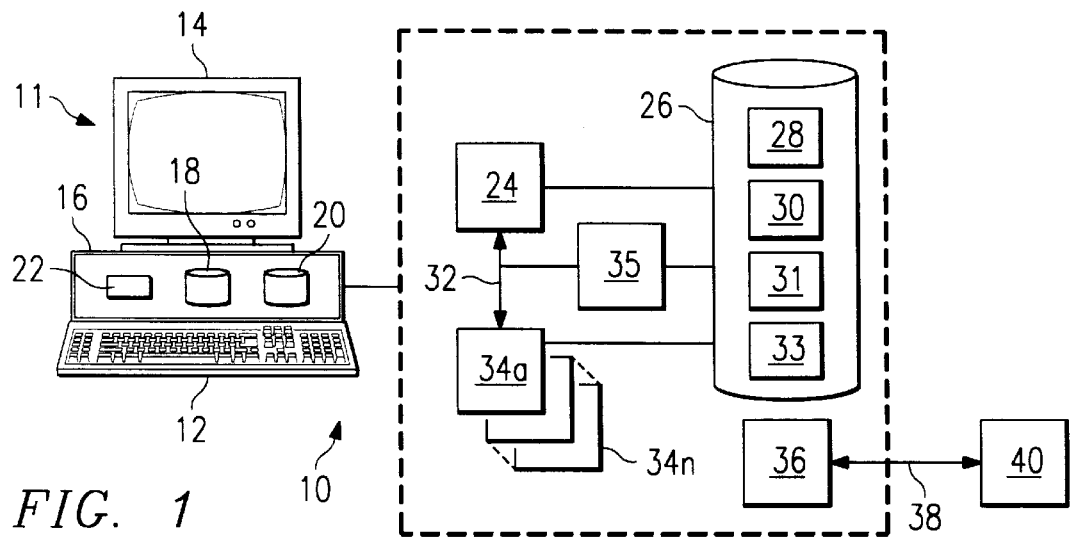
FIG. 1 illustrates a schematic block diagram of a software registration system constructed in accordance with the teachings of the present invention.

FIG. 1 illustrates a schematic block diagram of a software registration system 10 for implementing the present invention. In general, software registration system 10 implements two innovative functions. First, system 10 registers a software program using information from previously registered programs. Second, system 10 performs configurable post-registration activities.

Software registration system 10 may execute with any of the well-known MS-DOS, PC-DOS, OS-2, MAC-OS, WINDOWS™, UNIX, or other appropriate operating systems on a computer 11. Computer 11 may comprise, for example, a desktop computer, a laptop computer, a personal digital assistant, or any other computing or communicating device. Computer 11 includes an input device 12, an output device 14, random access memory (RAM) 18, read-only memory (ROM) 20, CD-ROM, hard drive, or other magnetic or optical storage media 22, or other appropriate storage and retrieval devices, and a processor 16 having a system clock or other suitable timing device or software. Input device 12 may comprise, for example, a keyboard, mouse, graphics tablet, touch screen, pressure-sensitive pad, joystick, light pen, microphone, or other suitable input device. Output device 14 may comprise, for example, a video display, a printer, a disk drive, a plotter, a speaker, or other suitable output device.

Software registration system 10 executes a registration software program 24. As used in this document, the term "software program" refers to a set of instructions, procedures, and/or functions and related data adapted for implementation in a suitable computer language such as C, C++, Java, or any other appropriate development language.

Registration software program 24 may access a memory 26 in the form of any volatile or non-volatile storage and retrieval device on computer 11. Memory 26 may include a variety of registration information and instructions to assist in operation of registration software program 24. Throughout this document, the term "registration information" refers to any information relating to characteristics of the user, characteristics of system 10, usage statistics, responses to previous requests for user data, answers to survey questions, registration profile data, or any other information provided, requested, accessed or otherwise related to a session between system 10 and a software program 34. In the illustrated embodiment, registration information in memory 26 includes a previous registration file 28, a registration profile 30, a usage statistics file 31, and a survey question file 33.

Registration software program 24 accesses information stored in memory 26 to perform a variety of sessions. As used in this document, the term "session" includes any interaction between system 10 and a software program 34 residing on or accessible by computer 11. A session may include defining, updating, or modifying registration information associated with a particular software program 34, presenting the user with survey questions or marketing information associated with software program 34, collecting statistics relating to the use of software program 34, completing a deferred registration or batched registration, performing a post-registration activity, or any other interaction or exchange of information between system 10 and software program 34.

The illustrated embodiment shows previous registration file 28, registration profile 30, usage statistics file 31, and survey question file 33 as separate files. These various types of information could be contained in a single file, or further separated into additional files without departing from the scope of the invention. Throughout this description the term "file" refers generally to any arrangement or organization of information that may be generated, accessed, and/or modified by computer 11. In the illustrated embodiment, data files 28, 30, 31, and 33 comprise configuration files that facilitate convenient modification of the stored information without requiring modifications to registration software program 24.

Registration software program 24 may be a stand-alone application or delivered integral to or with software program 34. Registration software program 24 assists the user in registering a software program 34 or hardware with its publisher or manufacturer, and performing a variety of post-registration activities. For example, a user may purchase a word processing application package which includes registration software program 24 and data files 28, 30, 31, and 33. In that case, registration software program 24 assists the user in registering the word processing software program with its publisher. In another embodiment, registration software program 24 may comprise a stand-alone software application that assists users in registering various software programs 34 with their respective publishers. In either case, registration software program 24 communicates through an interface 32 with other software programs 34a–34n residing on or accessible by computer 11.

Software registration system 10 also includes a usage monitor 35 that gathers usage statistics associated with software programs 34a–34n, and stores these usage statistics in usage statistics file 31. Registration software program 24 receives usage statistics by accessing usage monitor 35 and/or usage statistics file 31. System 10 may present selected or modified survey questions to the user based on usage statistics gathered by usage monitor 35.

Software registration system 10 also includes a communication interface 36 coupled to a remote device 40 using a communication link 38. Remote device 40 may be, for example, a remote server that receives, stores, and distributes information among a variety of remote devices. Communication link 38 may include any suitable wireline or wireless system that supports communication between communication interface 36 and remote device 40. For example, communication link 38 may be a public switched telephone network (PSTN), an integrated services digital network (ISDN), a local area network (LAN), a wide area network (WAN), a global computer network such as the Internet or other dedicated switched network, or other communication system at one or more locations. Interface 36 includes the appropriate hardware (e.g. modem, network interface card, etc.) and software (e.g., multi-layer protocol support, protocol conversion, data processing, data modulation, etc.) to communicate using a direct connection to a PSTN or ISDN, a connection through a LAN, WAN, or global computer network such as the Internet, or any other suitable communication connection that allows computer 11 to communicate with remote device 40 using communication link 38.

In one aspect of operation, registration system 10 accesses previous registration information to assist the user in performing a current software registration. In the illustrated embodiment, system 10 assists the user in registering software program 34a by accessing and retrieving selected registration information stored in previous registration file 28 within memory 26. The selected registration information includes registration information and/or responses to survey questions provided by a user or otherwise obtained during a previous registration session for a matching software program, designated by the reference numeral 34n. Software programs 34 are considered matching if they share a common attribute, such as the user, the national language of the software program, the publisher of the software program, or common registration information. The term "publisher" refers to the technology provider, software publisher, information gatherer, company, or other entity having an interest in distributing, collecting, maintaining, and utilizing registration and/or marketing information related to software program 34.

System 10 advantageously utilizes existing registration information associated with matching software program 34n and stored in previous registration file 28 to populate data fields presented to the user registering software program 34a. This saves the user from having to independently ascertain the information and alleviates the tedious and error prone task of data entry. In addition, system 10 stores registration information in a memory 26 to further facilitate data sharing between software programs 34 for future registrations. System 10 assigns a unique identifier, such as a registration number, to each software program 34 to eliminate duplicate outdated records without arduous searching for the duplicate files. Each registration of the same software program by a different user receives its own unique identifier. For example, in an office environment, where multiple users may register the same software program, each user's registration data receives a unique registration number. This provides an advantage of maximizing mailing lists for distributing marketing information.

The illustrated embodiment defines matching software programs as those sharing a common user, national language, and publisher, but may extend to other common attributes. The specific definition of matching programs to those associated with a common user helps to restrict the pool of potentially applicable previous registration files to those associated with software programs that the current user has previously registered. Software programs previously registered by the same user are more likely to contain reusable registration data. Segregating registration information based on the supported national language or languages is appropriate because two software programs supporting different national languages are unlikely to share common registration information that can be transferred from one to the other. Similarly, software programs from different publishers may seek different registration information in different formats. The concept of matching facilitates data sharing between software programs likely to have the same or similar registration information.

In another aspect of operation, system 10 performs a variety of post-registration activities, such as collecting user registration information, initiating activity sessions, presenting configurable marketing information, updating existing registration information, and other suitable activities based on a current registration status of each software program 34 residing on or accessible to computer 11. System 10 determines the current registration status of each software program 34 by identifying a current post-registration activity period. System 10 then determines the current activity date corresponding to the current post-registration activity period by comparing the current date to a series of activity dates, where each activity date represents a reference date plus a configurable post-registration activity period. The reference date may comprise any date suitable to serve as a date from which to measure. For example, the reference date may comprise the installation date of the software program. In one embodiment, system 10 defines the current activity date as the activity date immediately preceding the first activity date occurring after the current date.

By associating particular activities with particular configurable post-registration activity periods, publishers may customize the appearance of various registration and post-registration activities. For example, a publisher may specify that certain survey questions be asked three months after installation, and others six months after installation. Further, the publisher may desire that the user re-register or update the registration data for software program 34 after one year of use. A configurable registration profile 30 stored in memory 26 defines a number of configurable post-registration activity periods with corresponding activities to tailor presentation and collection of information after software installation.

System 10 performs sessions with or without user interaction by accessing previously stored registration information and/or performing post-registration activities. Upon completion of the session, system 10 determines a list of available communication methods and, in an interactive user embodiment, receives a selection from the user indicating a desired communication method. If the communication method involves using a modem or Internet connection, system 10 establishes a connection with remote device 40 through interface 36 and communication link 38. System 10 then transmits the completed registration information to remote device 40. Alternatively, if the user does not select a modem or network communication method, system 10 prints the completed registration information to a display, printer, floppy disk or other output device for later communication to the publisher of software program 34. In addition, system 10 may automate the communication of information to remote device 40 without user intervention.

While the illustrated embodiment shows an arrangement of directories and subdirectories, other arrangements, such as logical partitioning of data within a single file may be used without departing from the scope of the invention. The single file approach would be especially suitable to a single user system and may, for example, segment data into product-specific areas within the file, and a common area containing the most up-to-date version of registration information.

Figure 2A:
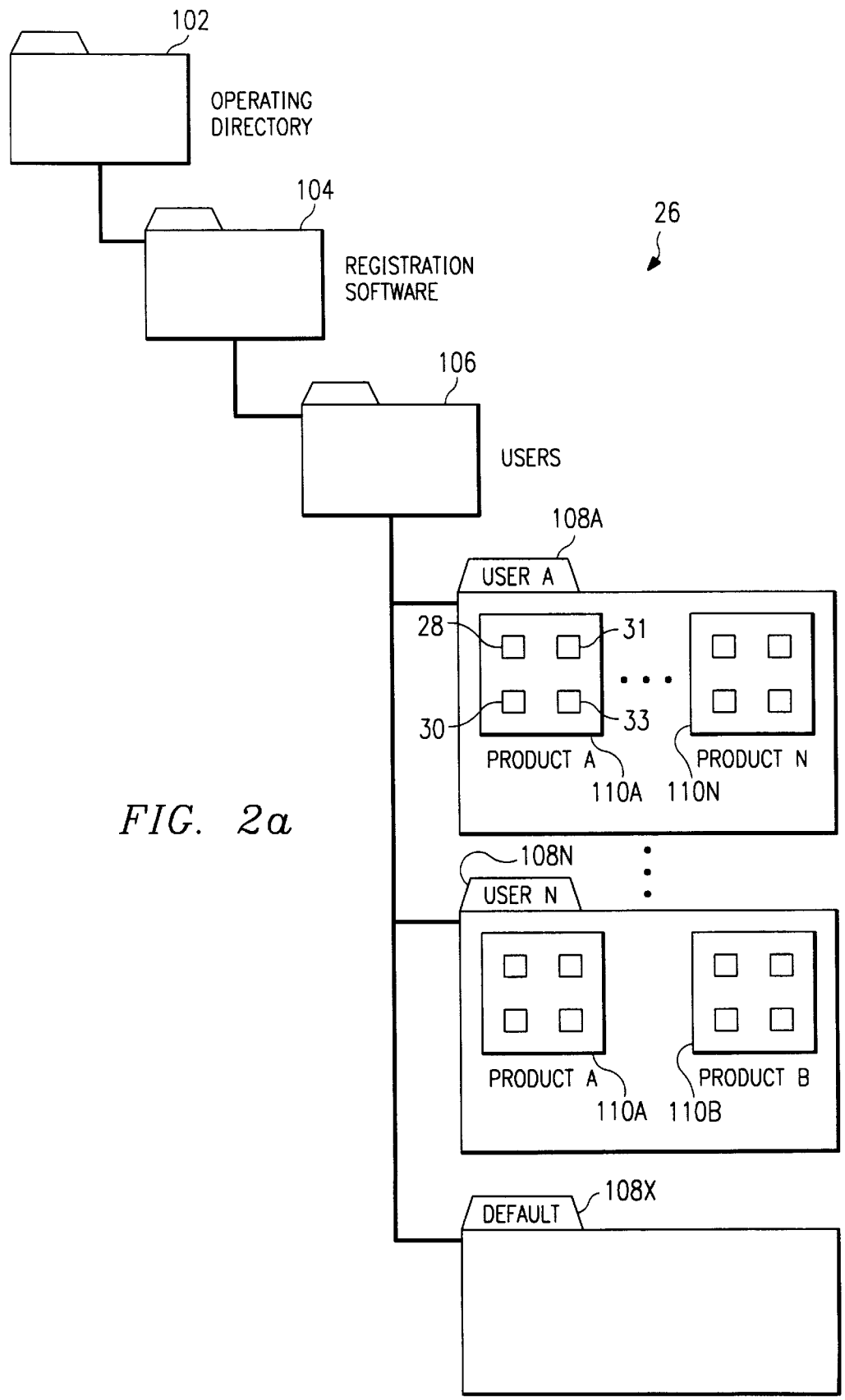

FIG. 2a illustrates a block diagram of an exemplary memory 26 maintained by computer 11. Memory 26 includes any data structure or arrangement, or combination of data structures and arrangements, to store and facilitate retrieval and modification of registration information maintained by system 10. In the illustrated embodiment, memory 26 includes an arrangement of directories and subdirectories, which arrange registration information according to the user interacting with the particular software program 34. As discussed above, registration information includes previous registration file 28, registration profile 30, usage statistics file 31, and survey question file 33.

Any number of directories and subdirectories may be used to provide a desired level of granularity to the division of registration information. In the embodiment shown in FIG. 2a, memory 26 comprises a general operating system directory 102. Subdirectories within operating system directory 102 include a registration software directory 104 and a user directory 106 within registration software directory 104. System 10 stores registration information relating to user A to user N in associated user directories 108A–108N, with an optional default user directory 108X. Partitioning data by user in a multi-user system provides an advantage of preventing one user from corrupting another user's registration information.

Each user directory 108A–108N includes a number of product files 110A–110N. Each product file 110 within user directories 108A–108N contains registration information relating a specific software program 34 that system 10 has previously registered with the user associated with the particular user directory 108. As part of the registration information, each product file 110A–110N includes information regarding certain attributes of software program 34. For example, product files 110 may include information, or pointers to configuration files containing information identifying the user associated with the previous registration, the national language or language supported by software program 34, and information identifying the publisher of software program 34.

FIG. 2b illustrates in more detail the contents of registration information maintained in memory 26. The information contained in data files 28, 30, 31, and 33 may reside in a common product file 110. Previous registration file 28 includes information established in previous sessions. Such information may include, for example, the product's unique registration number; the user's name, address, phone number, fax number, voice number, cellular number, e-mail address, and/or national language preferences; characteristics of computer 11, such as, the Firewall Proxy information, the modem dialing prefix, the amount of memory available, the size of the hard disk, or any other parameter of interest; the user's responses to previously asked survey questions; and information identifying the national language and publisher of the software program.

Various usage statistics associated with particular software programs may be stored in usage statistics file 31. Usage statistics file 31 may receive statistics, for example, from usage monitor 35 that monitors various usage statistics associated with particular software programs 34, such as the frequency, number, and time of use of software program 34; the commands or features invoked or not invoked; the problems or errors encountered; and other usage statistics relating to the user's interaction with software program 34.

A survey question file 33 contains one or more configurable survey questions to be presented to the user at configurable times, or based on particular information received, such as usage statistics. The subject of survey questions may be, for example, the user's satisfaction with software program 34, personal user data and other demographics, interest in other similar software products, and any other suitable subject to provide a configurable post-registration marketing or data collection function.

Information specific to the timing of registration, re-registration, presentation of marketing information or survey questions, and timing of the configurable post-registration activities may be stored in registration profile 30. Information stored in registration profile 30 includes timing reference information 134 useful in determining the appropriate timing of particular post-registration activities. This information may include, for example, the software program's installation date, the date of the last registration, a "last-accessed" date, and the date of the last marketing message presented to the user. In addition, timing reference information 134 may include data instructing system 10 when and how often to remind the user to complete various activities. For example, timing reference information may include a reminder interval indicating the desired frequency of reminder presentation, a reminder count for tracking the number of times the user has been reminded, and a reminder limit indicating the maximum number of reminders appropriate.

Registration profile 30 may further include activity timing information 136 comprising a plurality of configurable post-registration activity periods and a registration status associated with each activity period. The term "post-registration activity period," as used in this description, refers to a period of time for a specified activity to occur as measured from a reference date, such as the installation date of software program 34a, the date of last registration, the date of the last marketing message, or other suitable date. Post-registration activity periods may be measured in any appropriate increment, such as days, weeks, months, or years. Each post-registration activity period has one or more activities associated therewith.

Registration profile 30 may include an activity table 132 associating particular post-registration activity periods with particular activities. Each post-registration activity period may comprise an associated command instructing system 10 to initiate a particular activity, or a pointer to a configuration file containing survey questions or marketing presentation data. For example, a publisher may design registration profile 30 so that upon installation the software program, survey questions one and two (shown in survey question file 33) are presented to the user. Particular questions may be presented at configurable times to elicit timely responses from the user. In addition, questions presented may depend on information, such as usage statistics, received over the course of the user's operation of software program 34. Any activity may be initiated at a configurable post-registration activity period. For example, after one year, the user may be instructed to register the software program. Furthermore, the post-registration activity periods may be referenced to any point in time, such as a particular period after a re-registration.

Registration profile 30 may also include a chronology table 138 comprising at least one activity date. Activity dates are defined as a reference date, such as the system's installation date (or other suitable date), plus one of the configurable post-registration activity periods. System 10 generates an activity date for each configurable post-registration activity period associated with software program 34a. System 10 may generate the chronology table as it processes session data, or the chronology table may have been previously created and stored in registration profile 30 during initial registration of software program 34a. Details of the function of chronology table 138 will be discussed below.

Data files 28, 30, 31 and 33 may comprise, for example, configuration files containing data values or pointers to nested configuration files containing data values. Software publishers may package their software to include a number of configuration files, which may be accessed by software registration program 24 to facilitate customized activity sessions. A separate configuration file arrangement facilitates convenient modification of registration and marketing data as updates become necessary, without requiring modification of registration software program 24. For example, later versions of the configuration file that store survey question file 33 may provide updated survey questions modified in light of usage statistics received from usage monitor 35. As another example, publishers may tailor the timing of marketing presentations based on development of new products or updates for existing ones by supplying an updated registration profile 30.

Figure 3C:
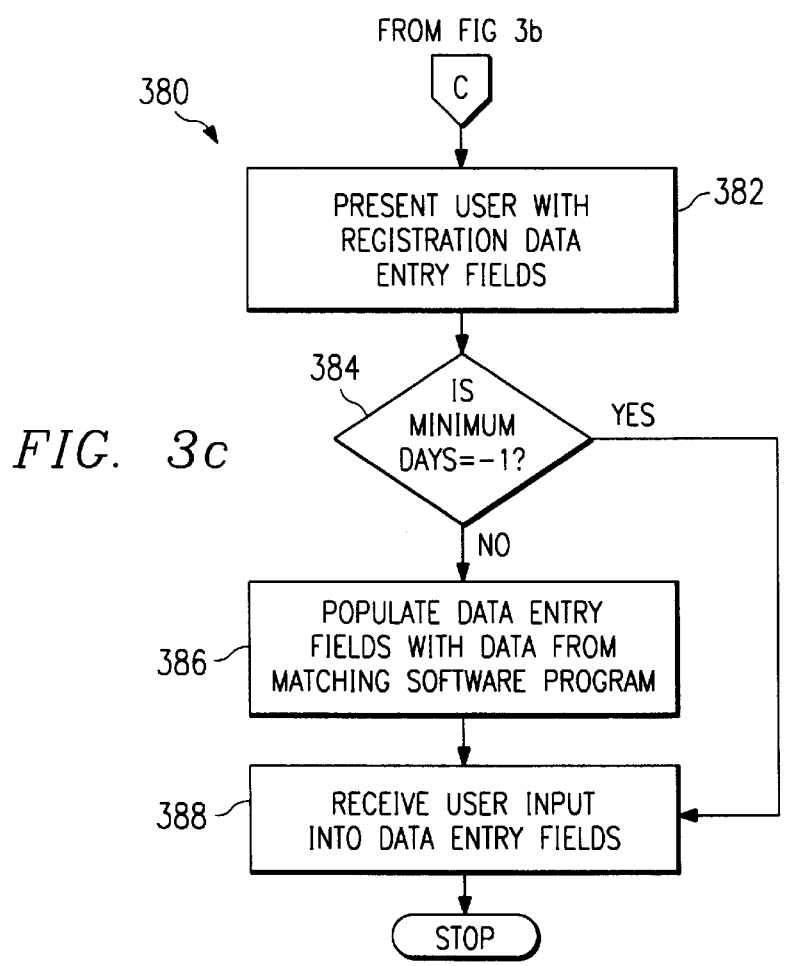
FIGS. 3a–3c are flow charts of an exemplary method for registering a software program.
Figure 3A:
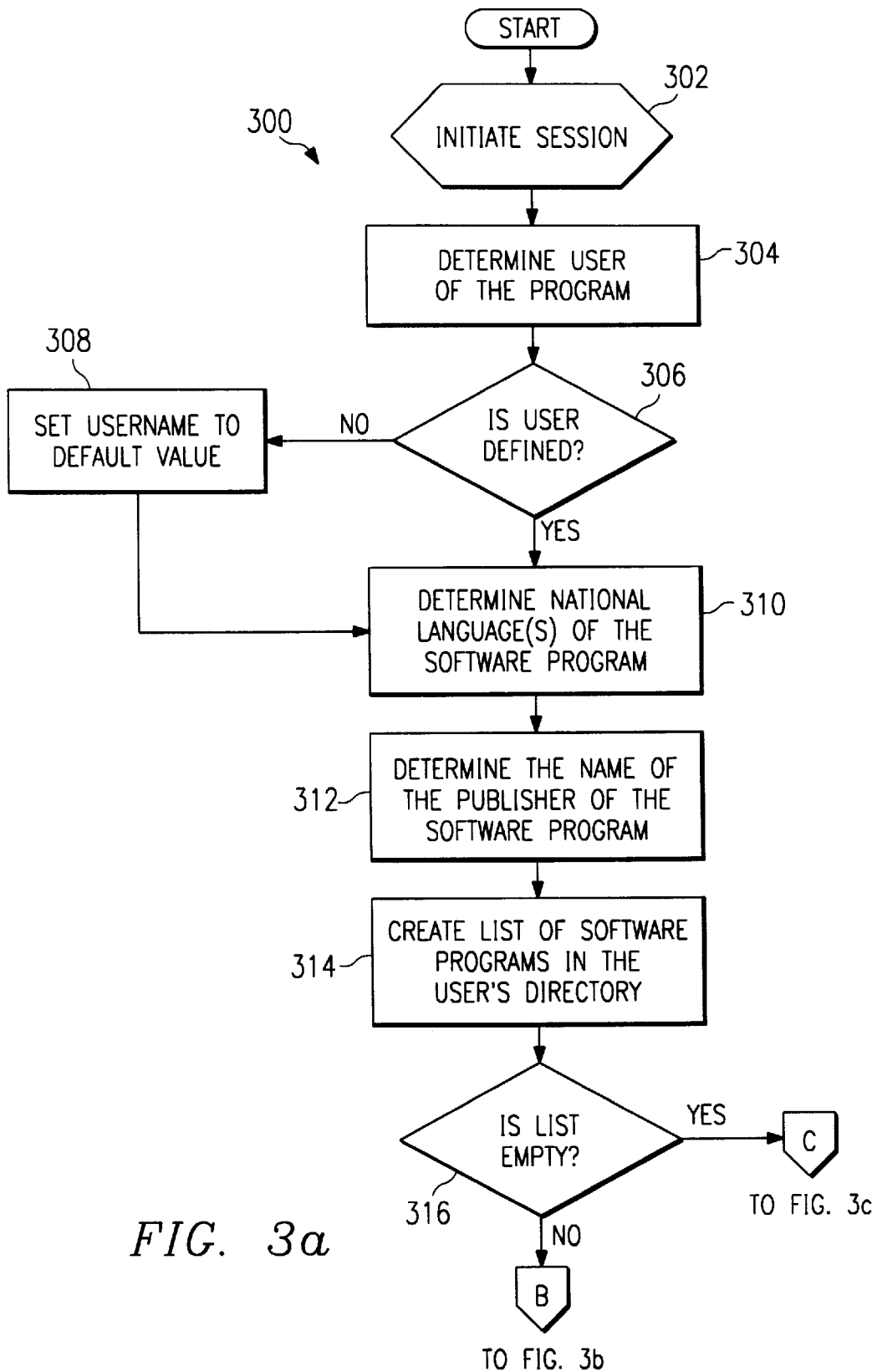
Figure 3B:
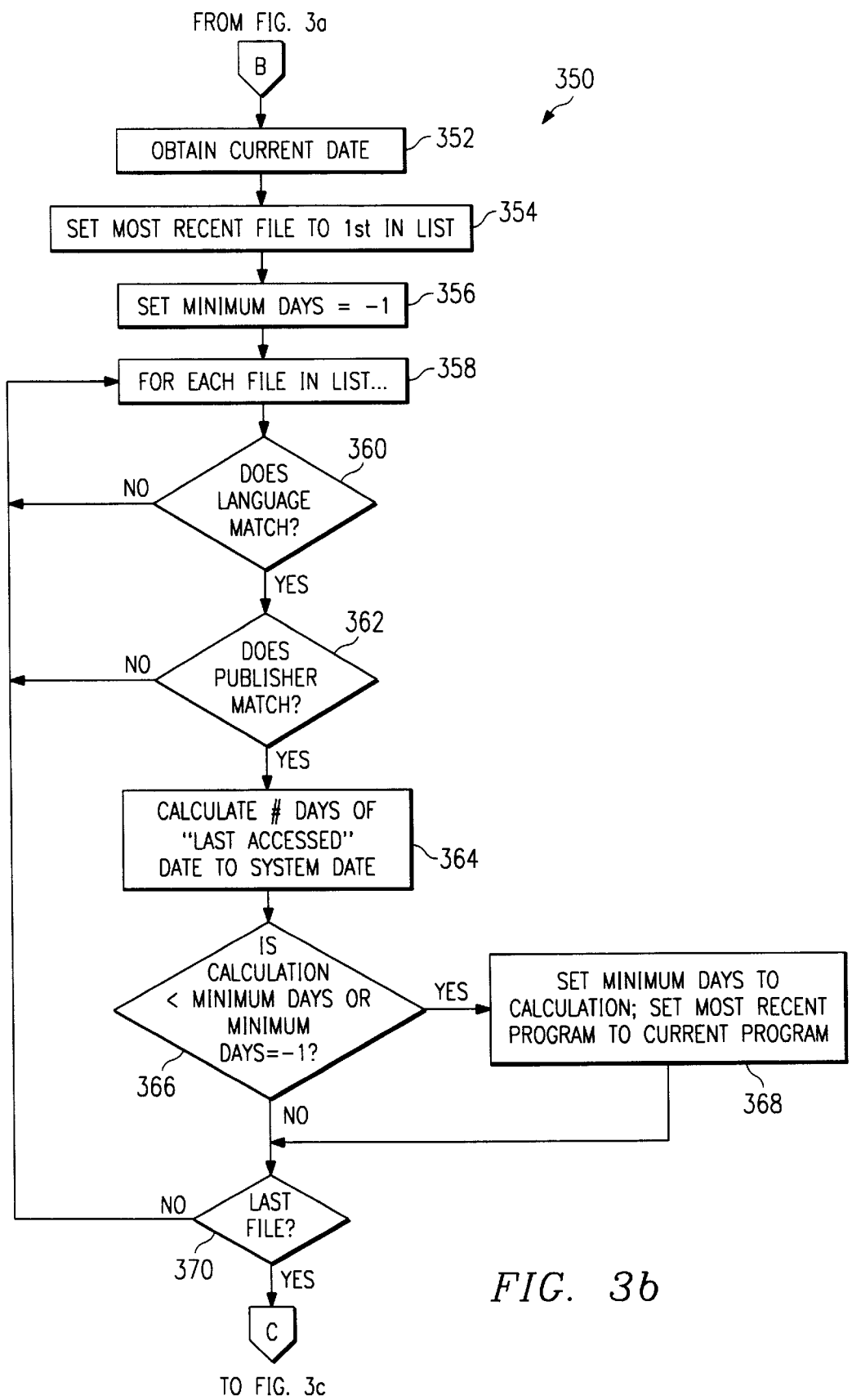

FIGS. 3a–3c are flow charts illustrating an exemplary method to register software program 34a using previously stored registration information. The method includes a section 300 (FIG. 3a) to generate a list of software programs residing on, or accessible to computer 11; a section 350 (FIG. 3b) to identify a matching software program; and a section 380 (FIG. 3c) to complete the registration session based on information associated with the matching software program.

The method begins at step 302 where system 10 initiates a registration session with a user by activating registration software program 24. System 10 may initiate a registration session in response to an installation of the new software program 34a on computer 11. Software program 34a being installed on computer 11 may include registration software program 24, which instructs system 10 to initiate registration. Alternatively, registration software program 24 may already exist on computer 11 from previous registrations or as a separately purchased application. Also, software program 34a may already reside on computer 11 unregistered.

System 10 determines the user of program 34a at step 304. The user may be identified, for example, by a login name. System 10 next determines whether the user has been defined at step 306. If the user has been defined, system 10 accesses user directory 108 associated with the user. If the user has not been defined, system 10 sets the username to a default value at step 308. Setting the username to a default value allows the user to access registration data stored in default user directory 108X. Default user directory 108X includes registration information associated with programs commonly available on system 10 and not associated with a particular user or users.

In another embodiment, rather than setting an undefined user to default user directory 108X, system 10 allows the user to access another user's directory and registration data. This may be desirable, for example, where multiple users reside within the same home, or otherwise share a common address, phone number, computer, or other attribute. The undefined user then accesses the previously stored registration information of another user, and utilizes that information in registering software program 34a.

Once system 10 identifies the user at step 306, or sets the username to a default value at step 308, system 10 determines the national language or languages supported by software program 34a at step 310. System 10 also determines the name of the publisher of software program 34a at step 312. System 10 creates a list of software programs 34 currently residing in user directory 108 associated with the user at step 314. In this embodiment, only files residing in the user's directory, and, thus, previously registered by the current user, are eligible to be identified as matching software programs. System 10 next checks whether the list of software programs 34 is empty at step 316. An empty list indicates that the present user has not previously registered a software program on system 10. If the list is empty, system 10 proceeds to section 380 and waits for user input. If the list is not empty, user directory 110 contains at least one previously registered software program 34. System 10 then proceeds to section 350 to determine whether any of the previously registered software programs 34 are matching software programs, and if so, which of the matching software programs has been most recently accessed, and therefore, contains the most recent registration information.

FIG. 3b is a flow chart showing an exemplary method of identifying a most recently accessed matching software program. System 10 obtains the current date at step 352, for example, by obtaining a system date from computer 11. System 10 next sets a first product file 110a in the list of matching software programs as the most recently accessed product file 110 at step 354. System 10 next sets a minimum days flag at step 356. The minimum days flag operates to alert system 10 that no more recently accessed product files 110 have been encountered since the current product file 110 has been designated the most recently accessed file.

Starting with the first product file 110a on the list at step 358, system 10 checks whether the national language of first product file 110a matches the national language of software program 34a being registered at step 360. If the national language matches, system 10 determines whether the publisher of first product file 110a matches the publisher of software program 34 being registered at step 362. If either the national language or the publisher does not match, system 10 proceeds to a next product file 110b at step 358. If the user, the national language, and the publisher match, system 10 designates product file 110a as associated with a matching software program, designated by reference numeral 34n. As described above, matching software program 34n is a software program having at least one attribute that matches an attribute of software program 34a being registered. In this embodiment, the user, the national language, and the publisher associated with each software program must match for the two software programs to be matching.

If system 10 determines that the language matches at step 360 and that the publisher matches at step 362, system 10 calculates the number of days since system 10 last-accessed matching software program 34b at step 364. System 10 determines the number of days since the last modification of matching software program 34b by, for example, determining the number of days between the current date and a "last-accessed" date stored in registration profile 30 of product file 110 associated with matching software program 34b. The last-accessed date identifies the last date that the file was modified in some way. It should be noted that system 10 may access registration information associated with software program 34b without making modifications and, therefore, not affect the last-accessed date.

System 10 determines whether the number of days between the current date and a "last-accessed" date is less than a "current minimum days" variable, or whether the minimum days flag is set to negative one at step 366. If either the number of days between the current date and a "last-accessed" date is less than the current minimum days variable or the minimum days flag is set to negative one, system 10 sets the current minimum days variable to the number of days between the current date and the last-accessed date, and designates matching software program 34b as the most recently accessed software program at step 368.

If more product files 110 remain on the list as determined at step 370, system 10 repeats, for each product file 110, the process of searching for another matching software program at steps 360–362, calculating the number of days since the matching software program was last accessed at step 364, and determining whether the current matching software program is the most recently accessed matching software program file at step 366. Once the last product file 110n has been encountered, system 10 completes the registration process at section 380 (FIG. 3c).

FIG. 3c is a flow chart showing an exemplary method of completing a registration session. System 10 presents the user with a number of registration data entry fields at step 382. System 10 then observes the status of the minimum days flag to determine whether any matching software programs were found at step 384. If no matching software programs were found, system 10 receives input from the user to complete the registration data entry fields at step 388. If at least one matching software program 34b was found, system 10 populates the data entry fields with registration information stored in previous registration file 28 associated with matching software program 34b at step 386.

Populating data fields with the most recent registration information ensures that the user's last update for each data item is captured and identified in all future presentations to the user. If the most recent data is not obtained, the old data will have to be updated time and time again, which inconveniences the user and increases the probability of error. Populating data fields with the most recent registration information saves the user from cumbersome data entry and reduces chances of error.

Upon populating the fields, system 10 receives user input necessary to complete or modify information in the registration data entry fields at step 388. Once the registration session is complete, system 10 provides a unique registration number to identify the registration information associated with software program 34a. This unique registration number provides an advantage of easy elimination of outdated duplicate files on computer 11 and on the publisher's database maintained at a remote location. System 10 also stores the last-accessed date for software program 34a as the current date in registration profile 30 and the unique registration number in previous registration information file 28.

Figure 4A:
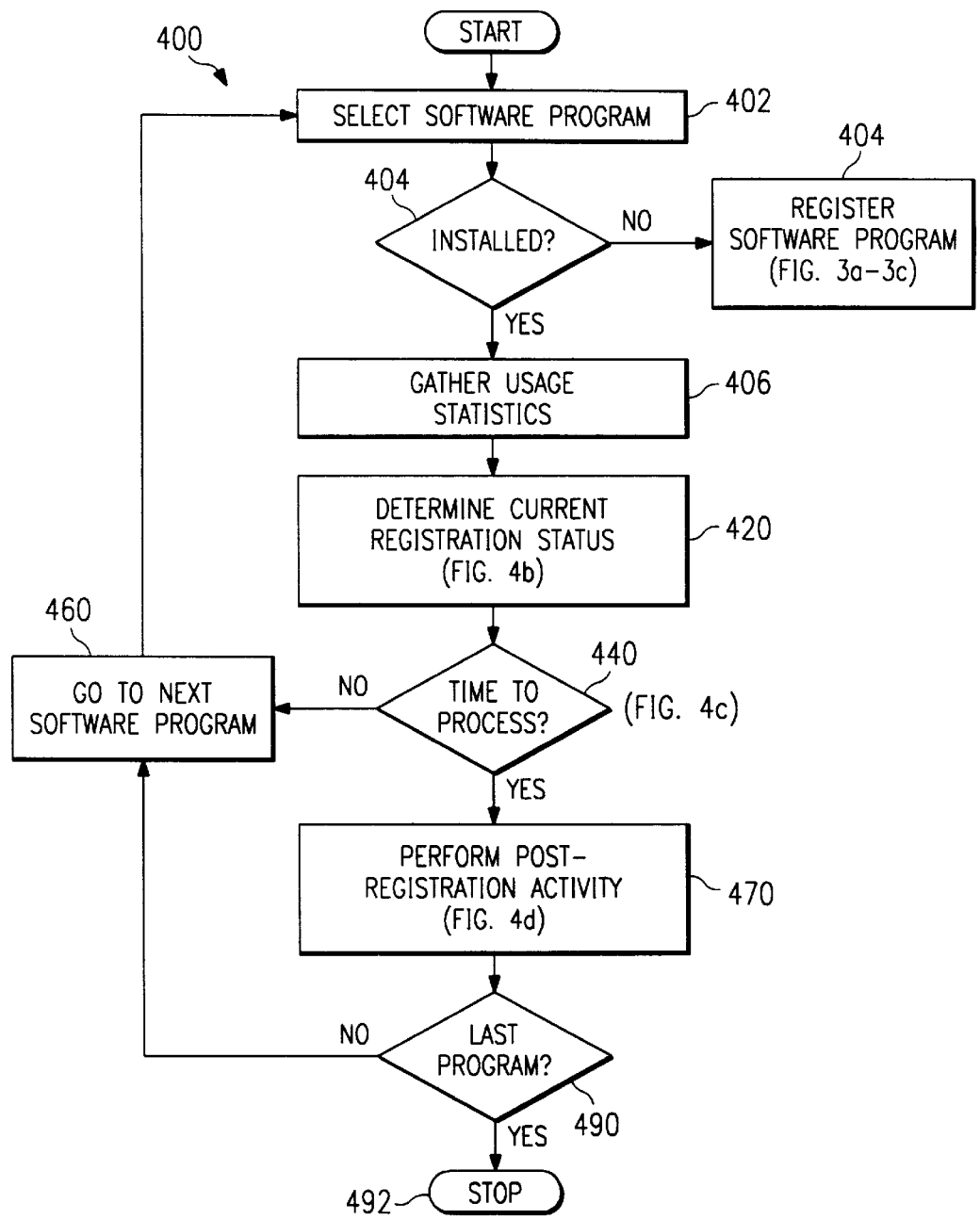
FIGS. 4a–4d are flow charts of an exemplary method for performing post-registration activity.
Figure 4B:
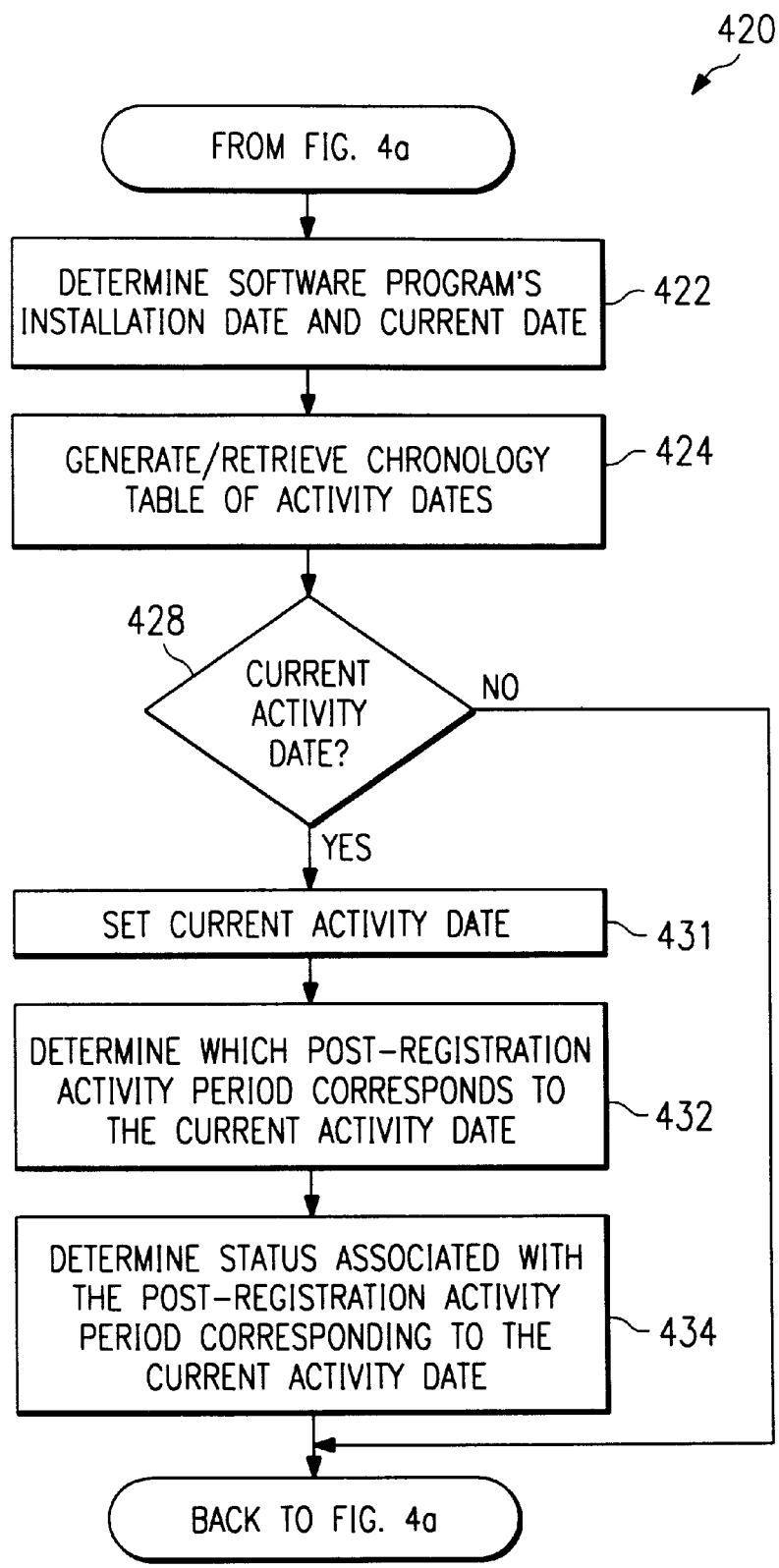
Figure 4C:
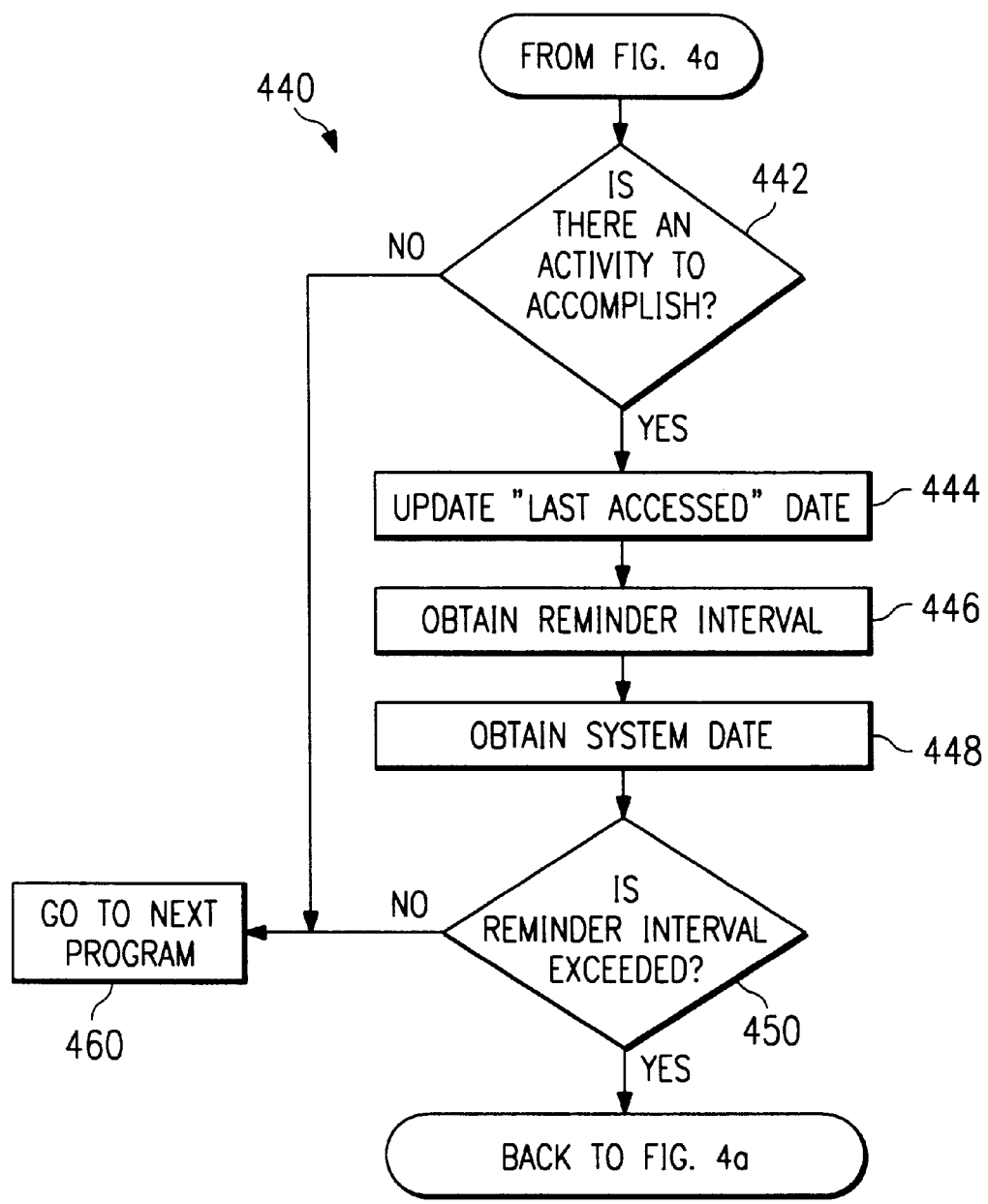
Figure 4D:
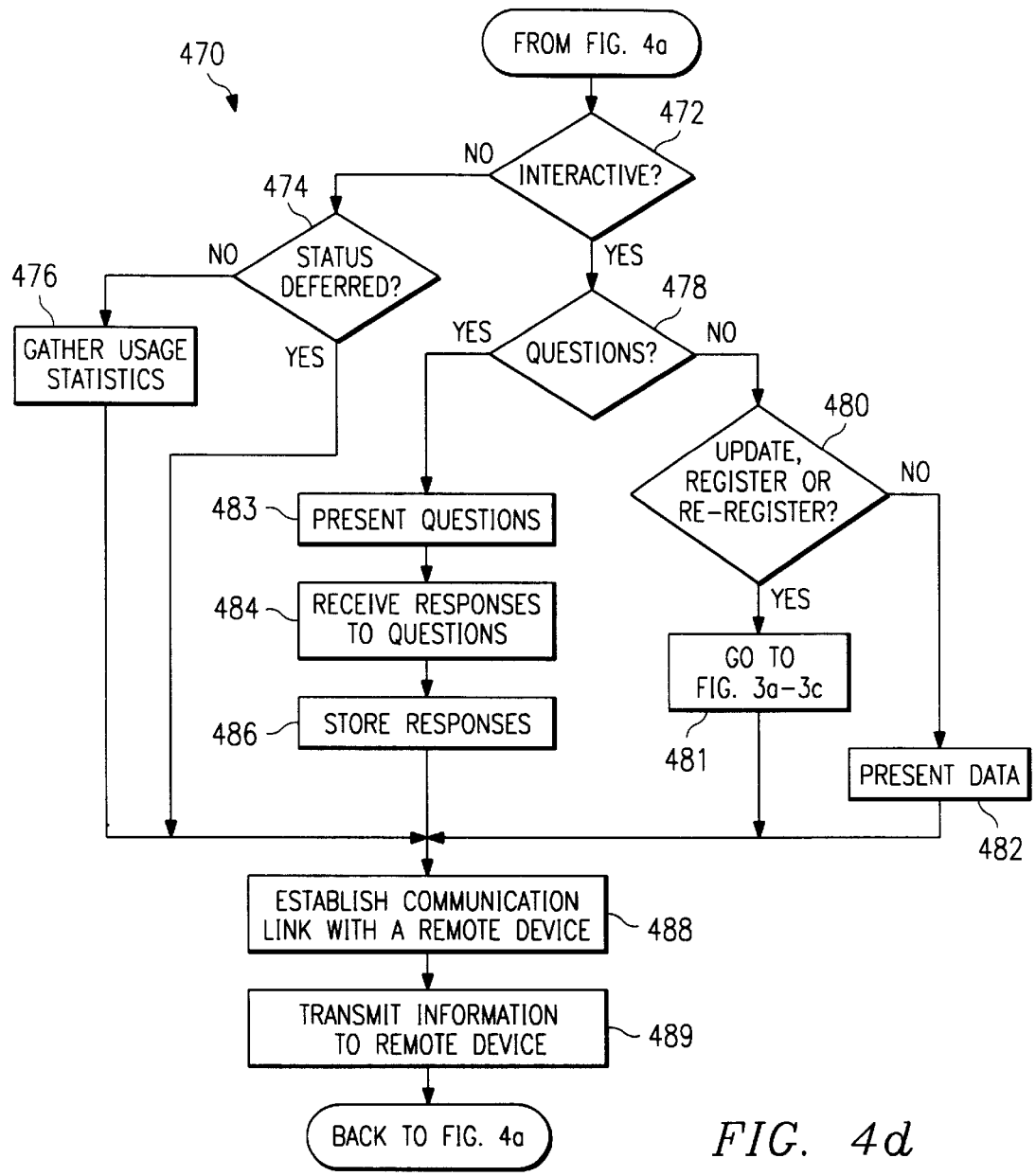

FIGS. 4a–4d are flow charts illustrating an exemplary method of performing post-registration activities associated with selected software programs 34. The method includes a section 400 (FIG. 4a) describing the overall operation of system 10; a section 420 for determining the current registration status of the selected software program 34 (FIG. 4b); a section 440 for determining whether processing is appropriate at a given time (FIG. 4c); and a section 470 for performing a post-registration activity (FIG. 4d).

The method begins at step 402, where system 10 selects software program 34a and accesses its associated registration information stored in memory 26. System 10 can process one or more software programs 34 to implement post-registration activities upon power up, at predetermined time intervals, upon specific user interaction, or based on other criteria. For purposes of this description, the logic of FIG. 4a processes designated software programs 34 in succession.

System 10 determines whether software program 34a has been previously installed on computer 11, or whether software program 34a is currently being installed at step 404. If software program 34a has not previously been installed, system 10 assists the user in registering software program 34a at step 404 in accordance with the method described above with reference to FIGS. 3a–3c. If software program 34a has previously been installed on computer 11, system 10 proceeds to gather usage statistics at step 406. System 10 obtains usage statistics by accessing usage monitor 35, or by accessing usage statistics 31 associated with software program 34a stored in memory 26. System 10 may or may not obtain usage statistics regarding software program 34a. If usage statistics are desired, system 10 may gather the statistics at any time during its interaction with software program 34a.

System 10 next determines the current registration status of software program 34a at step 420, which is described below in detail with reference to FIG. 4b. System 10 determines whether particular post-registration activities are scheduled to occur based on the current registration status of software program 34a at step 440, as described in detail below with reference to FIG. 4c. If system 10 is not scheduled to proceed with an activity associated with software program 34a, system 10 selects the next software program 34b at step 460 and continues processing at step 404. If, however, system 10 is scheduled to perform various activities associated with software program 34a, system 10 performs the scheduled activities at step 470, as described in detail below with reference to FIG. 4d. If system 10 determines to process additional programs 34 at step 490, system 10 accesses registration information associated with the next software program 34b at step 460 to continue processing at step 402. Otherwise, system 10 terminates the method at step 492.

In a particular embodiment, system 10 may store scheduled activities for each selected software program 34. Upon collecting each of the scheduled activities and their associated times, system 10 can coordinate multiple activities associated with one or more software programs 34 in a single session. For example, system 10 may gather usage statistics for software program 34a, ask the user questions regarding software program 34b, update or re-register software program 34c, and communicate registration information associated with software programs 34a–34c to remote device 40 in a single session. System 10 may determine which activities should be processed together in a single session by setting an activity grouping interval (e.g., by day, week, month) to group these activities.

This operation allows system 10 to coordinate and optimize interaction with the user and communication of information to remote device 40 to perform a variety of post-registration activities associated with a number of software programs 34.

FIG. 4b is a flow chart showing a method of determining the current registration status of software program 34a. System 10 begins by determining the installation date of software program 34a, and the current system date. System 10 determines the installation date of software program 34a by accessing registration profile 30 within memory 26. System 10 determines the current date, for example, by accessing the system clock of computer 11. If system 10 determines that there is no installation date associated with software program 34*a*, system 10 can initiate a registration procedure (FIGS. 3*a*–3*c*).

After determining the current date and installation date, system 10 generates or retrieves a chronology table of activity dates at step 424. Activity dates are defined as the system's installation date (or other suitable date) plus a configurable post-registration activity period. The configurable post-registration activity period may be determined, for example, by the publisher of software program 34*a* and included as part registration profile 30 delivered in the form of a configuration file with software program 34*a*. These post-registration activity periods indicate particular time periods after the installation of software program 34*a* that promote further communication or activity with the user. These activities may include, for example, presenting the user with survey questions, reminding the user to update registration information, presenting the user with timely marketing information, obtaining usage statistics, or any other activity appropriately undertaken at a configurable time.

System 10 generates an activity date for each configurable post-registration activity period associated with software program 34*a*. System 10 may generate the chronology table as it processes session data, or the chronology table may have been previously created and stored in registration profile 30 during initial registration of software program 34*a*. The illustrated embodiment assumes that the list of configurable post-registration activity periods in registration profile 30 appear in a chronological order. That is, in an ascending order so that the resulting activity dates appear in a chronological order. If the configurable post-registration activity periods are not provided in an ascending order, system 10 may place the periods in an appropriate ascending order, to obtain a chronology table having activity dates in chronological order.

System 10 determines whether the chronology table includes a current activity date associated with software program 34*a* at step 428. Software program 34*a* has a current activity date if there is an activity date that occurred before the current date. If there is no current activity date as determined at step 428, there is no activity for system 10 to perform, and the method of FIG. 4B ends. If there exists an activity date which occurs before the current date, system 10 sets a current activity date at step 431. Having identified the current activity date, system 10 then determines which configurable post-registration activity period corresponds to the current activity date at step 432. Upon determining the current post-registration activity period, system 10 obtains the current registration status by accessing registration profile 30 and reading the status associated with the current post-registration activity period at step 434.

The current status of software program 34*a* may be complete, uninstalled, reminder retry count exceeded, administration installation in place, incomplete, incomplete and never run before, deferred registration, or any other status appropriate to indicate that a particular action should or should not be taken. In the illustrated embodiment, a status of "complete" indicates that the activity scheduled for this time period has been completed. A status of "uninstalled" indicates that the publisher does not wish system 10 to operate on software program 34*a*. A status of "reminder retry count exceeded" indicates that the publisher does not want system 10 to remind the user to perform the particular activity. A registration status of "administration installation in place" indicates that a software administrator has "administratively installed" software program 34*a*. In the illustrated embodiment, system 10 will proceed to the next program 34 at step 442 upon encountering a registration status of complete, uninstalled, reminder retry count exceeded, or administrative installation in place.

A registration of "incomplete and never run before" indicates that system 10 has not presented the activity for that period to the user at all. A registration status of "incomplete" indicates that although system 10 may have presented the activity for this period to the user, the activity has not been completed and requires further processing. The registration status of "deferred registration" indicates that system 10 has completed the activities associated with this time period, but has deferred communication to the publisher until a later date.

FIG. 4*c* is a flow chart showing an exemplary method of determining whether it is time for system 10 to process various post-registration activities. Having obtained the current status of software program 34*a*, system 10 next determines whether there are one or more activities to perform at the current time at step 442 based on the status of software program 34*a*. If there are no activities to perform as determined at step 442, system 10 proceeds to process the next software program 34*b* at step 460 (FIG. 4*a*).

Upon encountering any registration status requiring additional processing, system 10 updates the "last-accessed" date of software program 34*a* at step 444. The last-accessed date of software program 34*a* indicates the last date that system 10 interacted with software program 34*a*, and may be stored, for example, in registration profile 30 of software program 34*a*. As described before, system 10 may access registration information associated with software program 34*a* without modifying the contents and altering the last-accessed date. System 10 then determines a reminder interval at step 446. For various reasons, publishers may or may not want system 10 to remind users to perform certain activities, or may want system 10 to remind users only a certain number of times. Publishers may set a reminder interval that specifies when and how often system 10 reminds the user to complete a particular activity. System 10 obtains the system date at step 448 and compares the system date to a date obtained by adding the reminder interval to the last-accessed date at step 450. If the reminder interval has not been exceeded, reminding the user to complete the activity is inappropriate, and system 10 proceeds to process the next software program 34*b* at step 460 (FIG. 4*a*). If the reminder interval has been exceeded, system 10 continues processing the current activity.

A given post-registration activity period may have associated with it several activities. Each activity may include an associated reminder interval. System 10 may perform the method described in section 440 for each activity. In addition, system 10 tracks the number of reminders communicated to a particular user to perform a particular activity. The number of reminders may be limited by a reminder count. If the reminder count is exceeded, system 10 ignores the uncompleted activity and skips to the next activity or software program.

FIG. 4*d* is a flow chart showing an exemplary method of performing a post-registration activity. For purposes of this description, FIG. 4*d* illustrates the performance of a selected activity, but system 10 may perform multiple post-registration activities in succession or in parallel associated with one or more software programs 34.

Upon determining from the current registration status that there are one or more activities to perform, system 10 determines whether the activity is interactive with the user at step 472. Certain activities require no user interaction, such as completing a deferred or batched registration session at step 474 and gathering usage statistics at step 476. If the current registration status is "deferred" as determined at step 488 or the activity to perform is to gather statistics at step 476, system 10 establishes communication with remote device 40 using communication link 38 at step 488. System 10 transmits deferred registration information and/or usage statistics to remote device 40 using interface 36 and communication link 38 at step 489. Alternatively, system 10 may store the information until all activities for all software programs 34 are complete. System 10 may then transmit a batch file associated with a number of post-registration activities.

Other post-registration activities lend themselves to user interaction. For example, system 10 may determine whether configurable survey questions are to be asked at step 478. If no survey questions are to be asked, system 10 determines whether software program 34 needs updating, registration, or re-registration at step 480. If updating, registration, or re-registration is necessary, system 10 follows the procedure outlined in FIGS. 3a–3c at step 481. If no questions are to be asked, and no updating, registration, or re-registration is necessary, system 10 presents information to the user at step 482, such as timely marketing information relating to new products from the publisher or updates to current products. By presenting the information based on the configurable post-registration activity periods supplied by the publisher, the publisher can advantageously control the presentation timing.

If the applicable registration activity includes asking the user survey questions as determined at step 478, system 10 presents questions at step 483. System 10 receives responses to the survey questions at step 484 and stores the responses at step 486. Receiving responses to survey questions may include receiving user input, or accessing previously stored registration information germane to the question. For example, system 10 may have previously presented the user with a similar question having a response that could be reused in the present question. The user's response to the previously asked question may have been stored in previous registration file 28 or registration profile 30 in memory 26, and may now be accessed to populate a portion of the answer data field for the user at step 484.

Configurable post-registration activity periods allow system 10 to present the question to the user at a time that the user is most likely to be able to provide an effective response. For example, particular questions may address issues that can only be determined through use of the program. Such questions would be inappropriate to present upon installation of the program. By asking these questions at later configurable times, the publisher obtains more valuable user input. In addition, specific questions may be tailored according to information stored in usage statistics file 31. By storing survey questions, marketing information, and other information associated with post-registration activities, the present invention provides an advantage of tailoring post-registration activities according to a configurable time period, specific usage statistics, or any other parameter aiding in selection of appropriate activities.

Upon completion of questions in steps 483–486 or other activities in steps 480–482, system 10 establishes communication with a remote device 40 using interface 36 and communication link 38 at step 488. System 10 transmits questions and associated responses, registration updates, or other registration information to remote device 40 using interface 36 and communication link 38. In an alternative embodiment, system 10 stores registration information until all activities for all software programs 34 are complete, and then transmits a batch file to remote device 40.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for registering a software program, comprising:

initiating a registration session for the software program;

searching a memory for a matching software program comprising a previously registered software program having at least one attribute that matches an attribute of the software program;

adding the matching software program to a list of matching software programs;

selecting the most recently accessed matching software program from the list of matching software programs;

retrieving selected registration information associated with the selected matching software program and provided by a user during a previous registration session for the selected matching software program; and proceeding with the registration session based on the selected registration information.

2. The method of claim 1, wherein identifying the matching program comprises identifying a previously registered software program associated with registration information presented in the registration session.

3. The method of claim 1, wherein identifying the matching program comprises:

determining a user, a national language, or the name of a publisher of the software program; and identifying a previously registered software program having a user, a national language, or a publisher matching the user, national language, or publisher of the software program.

4. The method of claim 1, wherein selecting the most recently accessed matching software program comprises:

determining a current date;

determining a last-accessed date of each matching software program;

comparing the current date to the last-accessed date of each matching software program; and selecting the matching software program having a last-accessed date closest to the current date.

5. The method of claim 1, wherein proceeding with the registration session comprises:

populating a registration data field with the selected registration information; and presenting the populated registration data field to a user.

6. The method of claim 1, wherein proceeding with the registration session comprises:

receiving current registration information from a user; and updating the registration information associated with the matching software program with the current registration information.

7. The method of claim 1, wherein proceeding with the registration session comprises:

receiving current registration information associated with the software program; and establishing a unique identifier for the current registration information associated with the software program.

8. The method of claim 1, further comprising communicating registration information associated with the software program to a remote device.

9. The method of claim 1, further comprising communicating registration information associated with the software program during a subsequent registration session for another software program.

10. The method of claim 1, further comprising:

monitoring usage statistics associated with the software program; and collecting the usage statistics during the registration session.

11. A system for registering a software program, comprising:

a memory operable to store registration information provided by a user during a previous registration session for a most recently accessed matching software program;

a user interface operable to receive input from a user; and a processor operable to retrieve the registration information associated with the matching software program for use in a registration session for a software program.

12. The system of claim 11, wherein the memory comprises a plurality of configuration files capable of being indexed according to at least one attribute of the matching software program.

13. The system of claim 11, wherein the memory comprises a plurality of configuration files capable of being indexed according to a user, a national language, or a publisher associated with the matching software program.

14. The system of claim 11, further comprising a usage monitor operable to gather usage statistics related to the software program.

15. The system of claim 11, further comprising a communication link operable to communicate information associated with the registration session to a remote site.

16. A computer readable media having a software program operable to execute the following steps on a processor of a computer:

initiating a registration session for a software program;

searching a memory for a matching software program comprising a previously registered software program having at least one attribute that matches an attribute of the software program;

adding the matching software program to a list of matching software programs;

selecting a most recently accessed matching software program from the list of matching software programs;

retrieving selected registration information associated with the selected matching software program and provided by a user during a previous registration session for the selected matching software program; and proceeding with the registration session based on the selected registration information.

17. The computer readable media of claim 16 wherein identifying the matching program comprises identifying a previously registered software program associated with registration information presented in the registration session.

18. The computer readable media of claim 16, wherein identifying the matching program comprises:

determining a user, a national language, or a publisher associated with the software program; and identifying a previously registered software program having a user, a national language, or a publisher matching the user, national language, or publisher associated with the software program.

19. The computer readable media of claim 16, wherein selecting the most recently accessed matching software program comprises:

determining a current date;

determining a last-accessed date of each matching software program;

comparing the current date to the last-accessed date of each matching software program; and selecting the matching software program having a last-accessed date closest to the current date.

20. The computer readable media of claim 16, wherein proceeding with the registration session comprises:

populating a registration data field with the selected registration information; and presenting the populated registration data field to a user.

21. The computer readable media of claim 16, wherein proceeding with the registration session comprises:

receiving current registration information from a user; and updating the registration information associated with the matching software program with the current registration information.

22. The computer readable media of claim 16, wherein proceeding with the registration session comprises:

receiving current registration information associated with the software program; and establishing a unique identifier for the current registration information associated with the software program.

23. The computer readable media of claim 16, further comprising communicating registration information associated with the software program to a remote device.

24. The computer readable media of claim 16, further comprising communicating registration information associated with the software program during a subsequent registration session for another software program.

25. The computer readable media of claim 16, further comprising:

monitoring usage statistics associated with software program; and collecting the usage statistics during the registration session.

26. A method for performing a post-registration activity associated with a software program, comprising:

accessing a memory comprising a reference date and at least one configurable post-registration activity period;

for each configurable post-registration activity period, generating an activity date comprising the reference date plus the configurable post-registration activity period;

comparing the current date to at least one activity date to determine a current activity date; and conducting a post-registration activity based on the determined current activity date.

27. The method of claim 26, wherein the reference date comprises an installation date of the software program.

28. The method of claim 26, wherein comparing the current activity date to at least one activity date further comprises identifying a current activity date having an activity date immediately preceding the first activity date occurring after the current date.

29. The method of claim 26, further comprising:
identifying a current post-registration activity period associated with the current activity date; and
accessing the memory to retrieve a registration status associated with the current post-registration activity period.

30. The method of claim 26, wherein the post-registration activity comprises registering the software program.

31. The method of claim 30, wherein registering the software program comprises:
accessing a memory comprising registration information relating to a previously registered software program;
presenting the user with a plurality of registration data fields; and
populating the data fields with registration information associated with the previously registered software program.

32. The method of claim 26, wherein conducting a post-registration activity comprises:
presenting the user with a configurable survey question associated with the current activity date; and
receiving a response to the configurable survey question.

33. The method of claim 26, wherein conducting post-registration activity comprises:
accessing a memory comprising registration information associated with the software program; and
updating registration information associated with a previously registered program.

34. The method of claim 26, wherein conducting a post-registration activity comprises:
determining that a registration status of the software program is deferred;
accessing a memory comprising registration information associated with the software program;
establishing a communication link with a remote device; and
transmitting the information associated with the software program to the remote device.

35. The method of claim 26, wherein conducting a post-registration activity comprises:
gathering usage statistics associated with the software program;
establishing a communication link with a remote device; and
communicating the usage statistics associated with the software program to the remote device.

36. The method of claim 26, further comprising:
establishing a communication link with a remote device;
transmitting information received during the session to the remote device.

37. A system for performing post-registration activities, comprising:
a memory comprising:
a reference date associated with a software program;
a configurable post-registration activity period associated with the software program; and
registration information relating to at least one previously registered software program; and
a processor operable to access the memory to determine a current registration status of the software program, the current registration status based on a relationship between the reference date, a current date, and the configurable post-registration activity period, the processor further operable to conduct a session based on the current registration status of the software, the processor further operable to access the memory in response to a current registration of the software program to retrieve selected registration information relating to a selected previously registered software program, and to utilize the selected registration information in the current registration of the software program.

38. The system of claim 37, wherein the selected registration information comprises information selected from a group consisting of information personal to the user and the user's previous responses to survey questions.

39. A computer readable media having a software program operable to execute the following steps on a processor of a computer:
initiating a session;
accessing a memory comprising a reference date and at least one configurable post-registration activity period;
for each configurable post-registration activity period, generating an activity date comprising the reference date plus the configurable post-registration activity period;
comparing the current date to at least one activity date to determine a current activity date; and
conducting a session based on the determined current activity date.

40. The computer readable media of claim 39, wherein the reference date comprises an installation date of the software program.

41. The computer readable media of claim 39, wherein the current activity date comprises:
an activity date immediately preceding the first activity date occurring after the current date.

42. The computer readable media of claim 39, further comprising:
identifying a current post-registration activity period comprising the configurable post-registration activity period associated with the current activity date; and
accessing the memory based on the current post-registration activity period to determine a current registration status the current registration status comprising the registration status associated with the current post-registration activity period.

43. The computer readable media of claim 42, wherein determining the registration status and conducting a session comprise:
determining that the registration status of the identified software is unregistered; and
conducting a registration session to register the software program.

44. The computer readable media of claim 43, wherein conducting a registration session to register the software program comprises:
accessing a memory comprising registration information relating to at least one previously registered software program;
presenting the user with a plurality of registration data fields; and
populating the data fields with registration information associated with the previously registered software program.

45. The computer readable media of claim 43, wherein determining the registration status and conducting a session comprise:

determining that the registration status of the software program is deferred;

accessing a memory comprising registration information associated with the software program;

establishing a communication link with a remote device; and transmitting the information associated with the software program to the remote device.

46. The computer readable media of claim 39, wherein conducting a session comprises:

presenting the user with a configurable survey question associated with the current activity date.

47. The computer readable media of claim 39, wherein conducting a session comprises:

accessing a memory comprising registration information associated with the software program; and updating the registration information associated with the software program.

48. The computer readable media of claim 47, further comprising updating registration information associated with a previously registered program.

49. The computer readable media of claim 39, wherein conducting a session comprises:

gathering usage statistics associated with the software program;

establishing a communication link with a remote device; and communicating the usage statistics associated with the software program to the remote device.

50. The computer readable media of claim 39, further comprising:

establishing a communication link with a remote device;

transmitting information received during the session to the remote device.

51. A system for performing post-registration activities, comprising:

a memory comprising:

a reference date associated with a software program;

a configurable post-registration activity period associated with the software program;

a chronology table comprising an activity date corresponding to each configurable post-registration activity period comprising the reference date plus one of the configurable post-registration activity periods; and a current activity date determined by comparing a current date to at least one activity date; and a processor operable to access the memory to determine the current activity date and to conduct a post-registration activity based on the determined current activity date.

52. The system of claim 51, wherein the reference date comprises an installation date of the software program.

53. The system of claim 51, wherein the current activity date comprises:

the activity date immediately preceding the first activity date occurring after the current date.

54. The system of claim 51, further comprising:

a usage monitor operable to gather usage statistics related to the software program; and wherein the memory comprises usage statistics related to the software program.

55. The system of claim 51, wherein the memory comprises at least one configurable survey question associated with the current activity date.

56. The system of claim 51, further comprising a communication link operable to couple the processor to a remote device.

\* \* \* \* \*